United States Patent [19]

Becker et al.

[11] Patent Number: 4,650,827

[45] Date of Patent: Mar. 17, 1987

[54] STABLE WATER-IN-OIL EMULSIONS

[75] Inventors: Larry W. Becker, Syracuse; Benjamin Shultes, III, Clay, both of N.Y.

[73] Assignee: Allied Corporation, Morris Township, Morris County, N.J.

[21] Appl. No.: 548,102

[22] Filed: Nov. 2, 1983

[51] Int. Cl.⁴ .............................................. C08F 2/32
[52] U.S. Cl. ................................... 524/801; 524/377; 523/337
[58] Field of Search ................ 524/801, 377; 523/337

[56] References Cited

U.S. PATENT DOCUMENTS

| | | | |
|---|---|---|---|
| 3,284,393 | 11/1966 | Vanderhoff et al. | 526/287 |
| 3,624,019 | 11/1971 | Anderson | 524/922 |
| 3,734,873 | 5/1973 | Anderson et al. | 260/29.6 |
| 3,826,771 | 7/1974 | Anderson et al. | 260/29.6 |
| 4,010,131 | 3/1977 | Phillips et al. | 524/801 |
| 4,022,736 | 5/1977 | Schmitt | 524/376 |
| 4,073,763 | 2/1978 | Tai | 523/337 |
| 4,230,608 | 10/1980 | Mura | 523/337 |
| 4,363,886 | 12/1982 | Lipowski et al. | 524/801 |

Primary Examiner—Paul R. Michl
Assistant Examiner—Alex H. Walker
Attorney, Agent, or Firm—Jay P. Friedenson; Patrick L. Henry

[57] ABSTRACT

In an improved water-in-oil emulsion of the type which contains one or more finely divided water soluble vinyl addition polymers, one or more water soluble water-in-oil emulsifying agents, a hydrocarbon liquid and an aqueous phase, the improvement comprising an aqueous phase ranging from about 30% to about 50% by weight of the emulsion.

30 Claims, No Drawings

STABLE WATER-IN-OIL EMULSIONS

BACKGROUND

1. Field of the Invention

This invention relates to stable water-in-oil emulsions. More particularly, this invention relates to water-in-oil polymer and copolymer emulsions having a water concentration of from about 25 to about 80 by weight based on the total weight of the emulsion which exhibit unusual stability properties.

2. Prior Art

Water-in-oil emulsions of water soluble vinyl addition polymers prepared from water-soluble ethylenically unsaturated monomers have become increasingly important in many areas. These areas include the use of these polymers in the treatment of municipal and industrial wastes, papermaking, as additives to control drift, clarification of aqueous solutions, stabilizers for drilling muds, in the secondary recovery of petroleum by water flooding and in many other applications. Typically, these polymers are made from water-soluble ethylenically unsaturated monomers which include acrylamide, acrylic acid, dimethylaminomethylmethacrylate, methacrylic acid, dimethylaminoethylmethacrylate and methylchloride and dimethyl sulfate quaternary derivatives thereof, dimethyldiallyl ammonium chloride, and other commercially available water soluble vinyl monomers.

For example, Vanderhoff, et al. U.S. Pat. No. 3,184,393 discloses a process for the preparation of water-in-oil emulsions of various water soluble polymers. While Vanderhoff does form an emulsion of various water soluble polymers, the emulsion is not stable, and Vanderhoff must precipitate his polymers as a solid in order to use his process economically.

These Vanderhoff water-soluble polymer systems suffer from several disadvantages. For example, the requirement that the polymers are precipitated as a solid creates additional processing problems. Although these polymers are most often available commercially as powders or as a finely-divided solid, they are most frequently utilized as aqueous solutions. Thus the solid polymer material must be dissolved in water prior to use. Although the various polymers are more or less soluble in water, difficulty is often experienced in preparing aqueous polymer solutions because of their slow dissolution and because the solid polymer is not readily dispersible in water. Furthermore, the dispersion of the solid polymer in water is hindered by its tendency to clump or remain as agglomerates on contact with water. Lumps of the solid polymer immediately form by the encapsulation of undissolved solids in an outer coating of water-wet polymer which retards the penetration of additional water into the agglomerate. Although many of these lumps are eventually dissolved by continued agitation, it is frequently impractical to agitate the solution for a sufficiently long period to obtain complete dissolution.

Several of the disadvantages of the Vanderhoff, et al. patent are allegedly obviated by Anderson, et al. U.S. Pat. No. 3,624,019. Anderson, et al. discloses a method of preparing emulsions of finely divided water soluble polymers prepared from ethylenically unsaturated vinyl addition monomers. The alleged advantage of the Anderson, et al. patent is that the polymer is not isolated in the solid form. Rather, the emulsions are formulated with one or more surfactants which cause them to readily invert into an aqueous solution of the polymer on addition to water. While Anderson, et al. did provide an advancement in the art, these Anderson et al. emulsions have not been as stable as industrial users would like to see in that they often separate into oil and aqueous phases after only a short time. It has been disclosed in the prior art that a part of this instability results from low inverting capabilities of known surfactant systems which mandate that large amounts of the surfactant must be added to the system to provide for inversion within a reasonable period of time after addition to water.

Other disadvantages of the Vanderhoff, et al. patent are alleged obviated by Anderson, et al. U.S. Pat. No. 3,826,771. This patent discloses a water-in-oil emulsion which allegedly exhibits unusual stability properties as compared to the emulsion disclosed in Vanderhoff. The emulsion of the Anderson et al. patent contains an aqueous phase ranging between 75 and 95% by weight of the emulsion. The Anderson et al. patent discloses that the increased water-to-oil ratio of the emulsion as compared to prior art emulsions such as those disclosed in Vanderhoff provides for the improved stability. While the Anderson, et al. emulsion allegedly obviates the stability problem in actual industrial use stability difficulties still persist.

It is therefore an object of this invention to provide a water-in-oil emulsion having improved stability characteristics.

Further objects and advantages of this invention will be apparent from this specification and appended claims.

SUMMARY OF THE INVENTION

Accordingly, this invention relates to an improved water-in-oil emulsion of the type which contains from about 5 to about 90 weight percent of finely divided water soluble vinyl addition polymer and one or more water soluble water-in-oil emulsifying agents, and said oil being a hydrocarbon liquid, said improvement comprising an aqueous phase ranging from about 25 to about 70% by weight of the emulsion.

The water-in-oil emulsion of the present invention is stable and exhibits the unique ability of rapidly dissolving in aqueous solutions. The polymer-containing emulsions of this invention release the polymer in water in the presence of one or more inverting surfactants in a very short period of time when compared to the amount of time required to dissolve a solid form of the polymer. The emulsion of the present invention is extremely stable. The stability exhibited by the composition of this invention is defined as the ability to maintain the dispersion of the polymer particles throughout the emulsion for a period of at least three weeks at which time the emulsion can be reformed with only slight agitation. The enhanced stability exhibited by the composition of the present invention is completely unexpected, especially in view of Anderson, et al. U.S. Pat. No. 3,826,771 which teaches that increased water-to-oil ratios rather than decreased ratios provide for increased stability.

DETAILED DESCRIPTION OF THE INVENTION

The stable water-in-oil emulsion of this invention comprises four essential ingredients and one optional ingredient:

1. an aqueous phase;

2. a polymer phase;
3. an inert hydrophobic liquid;
4. one or more water-in-oil emulsifying agents; and optionally
5. one or more inverting surfactants.

The polymer containing emulsion of this invention is comprised of an aqueous phase ranging from about 25 to about 70% by weight of the emulsion. The aqueous phase is defined as the amount of water present in the emulsion. The preferred amount of the aqueous phase is from about 25 to about 60% by weight of the emulsion, and in the particularly preferred embodiments the amount of the aqueous phase is from about 30 to about 50% by weight on the same basis. Amongst these particularly preferred embodiments, most preferred are those embodiments in which the amount of the aqueous phase is from about 32 to about 41 weight of the emulsion.

The emulsion of the present invention will usually have a polymer concentration of from about 15 to about 70% by weight of the emulsion. A preferred range is between about 20 and about 50% by weight of the emulsion, and a particularly preferred range is from about 20 to about 40% by weight of the emulsion. Amongst these particularly preferred embodiments, most preferred are those embodiments of the invention in which the polymer concentration is from about 25 to about 34% by weight of the emulsion.

Polymers which are useful in the conduct of this invention are well-known to the art and have been described in numerous publications and patents. Polymers which can be used in the practice of this invention include nonionic, cationic and anionic polymers. Illustrative of useful nonionic polymers are polyacrylamide, polymethacrylamide, and the like. Useful cationic polymers include copolymers of acrylamide or methacrylamide, and such cationic monomers as dimethyldiallyl ammonium chloride, quaternary derivatives of dimethylaminoethyl methacrylate and acrylate as for example quaternized derivatives of methyl chloride and dimethyl sulfate, and homopolymers of such cationic monomers. Exemplary of useful anionic polymers are copolymers of acrylic acid and acrylamide, copolymers of methacrylic acid and acrylamide, copolymers of acrylamide and 2-acrylamido-2-methylpropanesulfonic acid (AMPS) and the like. Also useful are copolymers of acrylamide with other vinyl monomers such as maleic anhydride, acrylonitrile, styrene and the like. Other water-soluble vinyl polymers which can be used in the emulsion of this invention are described in detail in the following U.S. Pat. Nos. 3,418,237, 3,259,570 and 3,171,805. Gums are well-known water-soluble polymers which can also be used in the conduct of this invention, and are described in vol. 10 of the Encyclopedia of Chemical Technology, 2nd edition, Interscience Publishers, 1966.

The polymers most commonly used in many industrial applications are acrylamide polymers which include polyacrylamide and its water-soluble copolymeric derivatives such as acrylamide/acrylic acid copolymer, acrylamide/ acrylic acid salt copolymers which contain from about 95 to about 5% by weight of acrylamide based on the total weight of the polymer, acrylamide, acrylamide/2-acrylamido-2-methylpropanesulfonic acid copolymers and copolymers of acrylamide and the methyl chloride or dimethyl sulfate quaternary derivative of dimethylamino ethylmethacrylate which contain from about 2 to about 95 mole % of the cationic monomer, and like acrylamide polymers and copolymers.

It is preferred in the practice of this invention to use acrylamide polymers and copolymers which are water-soluble and which contain at least about 5% by weight of acrylamide based on the total weight of the polymer. In the particularly preferred embodiments of this invention, the polymer is polyacrylamide, or a copolymer of acrylamide and acrylic acid having an acrylic acid content equal to or less than about 10% by weight of the polymer.

The molecular weight of the polymers described above may vary over a wide range, for example from about 10,000 to about 25,000,000. The invention, however, finds its greatest usefulness in preparing aqueous solutions or dispersions of these polymers and, in particular, acrylamide polymers whose molecular weight are in excess of 1,000,000. Polymers having higher molecular weights are more difficult to dissolve in water and tend to form extremely viscous solutions at relatively low concentrations. Also, the polymers may be produced by any known methods of conducting polymerization reactions. Thus, solution suspension or emulsion polymerization techniques may be used.

The oils used in preparing the emulsion of this invention may be selected from a large group of organic liquids which include liquid hydrocarbons and substituted liquid hydrocarbons. A preferred group of organic liquids are the hydrocarbon liquids which include both aromatic and aliphatic compounds. Representative of such hydrocarbon liquids are benzene, xylene, toluene, mineral oils, kerosenes, naphthas and in certain instances petrolatums.

The aliphatic and aromatic hydrocarbon oils which are useful in the practice of this invention will usually comprise from about 5 to about 95% by weight of the emulsion. In the preferred embodiments of the invention, the amount of such oils is from about 10 to about 50% by weight of said emulsion, and in the particularly preferred embodiments in from about 20 to about 45 weight percent by weight of the emulsion. Amongst these particularly preferred embodiments, most preferred are those embodiments in which the amount of oil is from about 25 to about 35% by weight of the emulsion.

The water-in-oil emulsifying agents for use in the emulsion of this invention are not critical, and emulsifying agents known to those of skill in the art can be employed. Useful emulsifiers include various ethoxylated sorbitan derivatives of high molecular weight fatty acids, as for example ethoxylated sorbitan oleates and stearates. Preferred for use in the practice of this invention are emulsifying agents or mixtures thereof having HLB ratios of less than about 9, and preferably from about 4.5 to about 8. Such low HLB materials are documented in the literature and are summarized in the Atlas HLB Surfactant Selector. Although these emulsifiers are preferred for use in this invention and produce good water-in-oil emulsions, other surfactants may be used as long as they are capable of producing these emulsions.

The amount of emulsifying agent required to provide a stable emulsion will have to be determined by routine experimentation. As a general rule it may be said that the amount of oil-soluble emulsifier may range from about 0.1 to about 30 percent by weight based on the total weight of the oil. In the preferred embodiments of the invention the weight percent of emulsifier will vary from about 1 to about 10% by weight based on the total weight of the oil, and in the particularly preferred embodiments will vary from about 2 to about 8 weight percent on the aforementioned basis. Amongst these particularly preferred embodiments most preferred are those embodiments in which the weight percent of emulsifying agent varies from about 2 to about 6 weight percent on the aforementioned basis.

The preferred embodiments of the emulsion include an inverting surfactant system. In these preferred embodiments of this invention, the emulsion will include from about 0.2 to about 8 weight percent of a surfactant system based on the total weight of the emulsion. In the particularly preferred embodiments of the invention, the emulsion will include from about 0.5 to about 5 weight percent of the surfactant system based on the total weight of the emulsion. Amongst these particularly preferred embodiments, most preferred are those embodiments which contain from about 0.75 to about 2 weight percent of a surfactant system based on the total weight of the emulsion.

Any anionic, cationic, or nonionic surface active materials can be used in the practice of the invention. Examples of suitable anionic surfactants are alkali metal, ammonium and amine soaps; the fatty acid part of such soaps contains preferably at least 16 carbon atoms because soaps based on lauric and myristic acids have a great tendency to develop abundant foam. Other examples of suitable anionic surfactants are alkali metal salts of alkyl-aryl sulfonic acids, sodium dialkyl sulfosuccinate, sulfated or sulfonated oil, such as sulfated castor oil; sulfonated tallow, and alkali salts of short chain petroleum sulfonic acids.

Examples of suitable cationic surfactants are salts of long-chain primary, secondary, or tertiary amines, such as oleylamine acetate, cetylamine acetate, didodecylamine lactate, the acetate of aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl didodecyl ammonium chloride.

Examples of suitable nonionic surfactants are condensation products of higher fatty alcohol with ethylene oxide, such as the reaction product of oleyl alcohol with 10 ethylene oxide units; condensation products of alkyl-phenols with ethylene oxide, such as the reaction product of isooctylphenol with 12 ethylene oxide units; condensation products of higher fatty acid amides with five, ore more, ethylene oxide units; polyethylene glycol esters of long chain fatty acids, such as tetraethylene glycol monopalitate, hexaethyleneglycol monolaurate, nonaethyleneglycol monostearate, nonaethyleneglycol dioleate, tricosaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty ester, and their inner anhydrides (mannitolan-hydride, called Mannitan, and sorbitol-anhydride, called Sorbitan), such as glycerol monopalmitate reacted with 10 molecules of ethylene oxide, pentaerythritolmonooleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monstearate (550 meaning the average molecular weight of the polyglycol ether). A combination of two or more of these surfactants may be used, e.g. a cationic may be blended with a nonionic or an anionic with a nonionic.

Following is a list of suitable surfactants that could be used in the practice of this invention. Any water-soluble surfactant could be used, but naturally some are more efficient than others. Preferred hydrophilic surfactants for use in the fracture of this invention include, but are not limited to: polyoxyethylene alkyl phenol, polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatted and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

The preferred inverting surfactants are hydrophilic and are further characterized as being water-soluble.

Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used. Other preferred surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl of alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide. A particularly preferred inverting surfactant for use in the practice of this invention is a mixture of from about 5 to about 75 weight percent polyethylene glycol and from about 25 to about 95 weight percent of one or more of the above described surfactants. Any water soluble polyethylene glycol can be used in these particularly preferred embodiment, however, those which are used will usually have an average molecular weight of from about 200 to about 6000 and preferably from about 200 to about 2000.

In certain embodiments of this invention, the inverting surfactant may be directly added to the polymer-containing emulsion; thereby rendering it selfinverting upon contact with water. These products, while capable of being used in certain systems, must be carefully formulated since the surfactants may tend to interact with the emulsifier or the emulsion and destroy it prior to its being used.

In other embodiments of this invention, the surfactant can be added to the water rather than to the emulsion in which case the polymer containing emulsion will invert on contact therewith. In these embodiments, the amount of surfactant added to the water can vary widely, however, such amount is usually at least about 0.25 weight percent of the surfactant by weight of emulsion added to the water. In the preferred embodiment of the invention, the amount of surfactant added to the water may range from about 0.3 in about 10 weight percent by weight of emulsion, and in the particularly preferred embodiments may range from about 0.4 to about 5.0 weight percent on the aforementioned basis. Amongst these particularly preferred embodiments, most preferred are those embodiments in which the amount of the surfactant added to water varies from about 0.5 to about 2 weight percent by weight of the emulsion.

In one procedure of preparing the novel emulsion of this invention, the water-soluble vinyl addition polymers or the gums are dispersed into the water-in-oil emulsion containing one or more suitable emulsifying agents. The polymers as produced by most manufacturing processes are in the form of powders or lumplike agglomerates of varying particle size. It is desirable that the particles, before being placed into the emulsion, be comminuted by grinding, abrading or the like so that their average particle size is less than about 5 millimeters and preferably is within the range of from about 0.25 to about 5 microns. After the powders have been comminuted, they be dispersed into the water-in-oil emulsion by means of agitation provide by such devices as stirrers, shakers and the like afterwhich the desired amount of inventing surfactant can be added.

It also is possible to prepare the polymer-containing emulsion of the water-soluble vinyl addition polymers directly from the vinyl monomers from which there polymers are synthesized. Such polymer-containing emulsion may be synthesized by using the water-in-oil emulsion polymerization technique set forth in U.S. Pat. No. 3,284,393. The teachings of this patent comprise forming a water-in-oil emulsion of water-soluble ethylenically unsaturated monomers. The emulsion is formed by utilizing a water-in-oil emulsifying agent. To this monomer is added a free radical-type polymerization catalyst and then heat is applied under free radicalforming conditions to form water-soluble polymer latices. The polymeric lattices produced by this patent are relatively unstable and frequently must be treated with additional emulsifiers to render the products stable. After formation of the emulsion an effective amount of an inverting surfactant can be added.

The following specific examples are presented to more particularly illustrate the invention.

EXAMPLE I

An oil phase is prepared by mixing 150 g of a low aromatic kerosene with 15.0 g of a emulsifier blend of a sorbitan monoleate, ethoxylated 12-hydroxystearic acid and sorbitan trioleate having a HLB ratio of 5.0. The resulting oil phase is emulsified with a Silverson mixer while 280 g of 50% aqueous acrylamide (containing a copper chelant which is marketed and manufactured by Dow Chemical Co. under the tradename Versenex 80) is added. Additional amounts of double distilled water is added to obtain the desired oil to water ratio. The emulsification process is continued until 90% of the droplets are between 0.5 and 3$\mu$ in size. The resulting water-in-oil emulsion is charged into a 1 L glass jacketed resin kettle equipped with a stirrer, nitrogen sparger and thermometer. The emulsion is sparged with nitrogen for 0.5 hr. to remove oxygen. Water at 40.0°±1.0° C. is circulated through the reactor jacket to maintain the reaction temperature. The system is designed to allow circulation of cooling water in the event of exotherms. A polymerization promoter 2,2'-azobis-(2,4-dimethylvaleronitrile) manufactured and marketed by DuPont under the tradename Vazo ®52 (0.03 g in 1 ml toluene) is added to the reactor and the polymerization is continued until less than 1% monomer is present. An inverting surfactant, ethoxylated nonylphenol, manufactured and sold by Rohm & Haas under the tradename Triton N-101 (12 g) is slowly added over a 1 hr. period. The products have viscosities of 4.0 to 5.0 cps at 25.0° C. (LVT-UL 60 rpm; 0.1% polymer in 1 M sodium nitrate).

EXAMPLE II

An anionic emulsion with 8 mole % charge was prepared in a manner similar to Example I. Kerosene (150 g) is mixed with 15.0 g of the emulsifier blend of Example I in which the HLB ratio has been adjusted to 7.0. An aqueous acrylamide solution (50%, 291 g) is mixed with 44.6 g of a 28.3% aqueous sodium acrylate solution. The resulting water-in-oil emulsion is polymerized to low residual monomers using Vazo 52 (0.03 g in 1 ml of toluene) and the polymerization catalyst. Triton N-101 (6.0 g) is added to complete the synthesis of the emulsion. The product exhibited Brookfield viscosities of 4.0 to 5.0 cps at 25° C. (LVT-ULA, 60 rpm); 0.1% polymer in 1M sodium nitrate.

EXAMPLE III

A cationic emulsion with 10 mole % charge was prepared by the method described in Example I. Kerosene (150 g) is mixed with 12.5 g of the emulsifier blend of Example I in which the HLB ratio has been adjusted to 6.0. An aqueous acrylamide solution (50%; 252 g) is mixed with 54.5 g of a 75% aqueous dimethylaminoethylmethacrylate/methyl chloride quaternary solution. The resulting water-in-oil emulsion is polymerized to low residual monomers using Vazo ®52 (0.03 g in 1 ml of toluene) as the polymerization promoter. Triton N-101(8 g) is added to complete the emulsion product. The resulting product exhibited a Brookfield viscosity of 3.9 cps at 25° C. (LVT-UL 60 rpm); 0.1% polymer in 1M sodium nitrate.

EXAMPLE IV

A series of polymeric emulsions containing polyacrylamide as the polymer component, the emulsifier blend used in Example I as the emulsifying agent and Triton N-101 as the inverting detergent were prepared in accordance with the procedure of Example I. The stability of these emulsions, which contained varying amounts of water, was determined in accordance with the following procedure.

Inverse Emulsions Stability Test Procedure Into a 25 ml graduated mixing cylinder was poured 20 ml of the emulsion. The cylinder was placed into an oven maintained at 50° C. The emulsion was examined at appropriate intervals and measure phase separation. The depth of the oil layer at the top of the sample was noted and recorded in mL, and the depth of the cream layer was also noted and recorded in mL at the bottom of the cylinder. The cream layer will usually adher to the cylinder bottom is tipped and is most easily observed when the cylinder is tipped upside down. The results of the evaluation are set forth in the following TABLE I:

TABLE I

|  | Emulsion 1 | Emulsion 2 | Emulsion 3 | Emulsion 4 | Emulsion 5 |
|---|---|---|---|---|---|
| % H$_2$O | 45.2% | 37% | 34.6% | 30.5% | 25.5% |
| Bulk Viscosity (cps) | 340 | 100 | 75 | 50 | 50 |
| Oil Separation | gelled @ 50° C. | 1½ ml | ¼ ml | ½ ml | ½ ml |
| Creaming | gelled @ 50° C. | 4 ml | ½ ml | ¼ ml | 1 ml |
| Days in oven @ 50° C. | — | 38 | 32 | 34 | 37 |
| Appearance | White | Transparent | Transparent | White | White |

EXAMPLE V

Employing the procedure of Example-II, a series of polymeric emulsion containing a copolymer of polyacrylamide and acrylic acid containing 8 mole percent of the acid monomer as the polymer component, the emulsifier blend used in Example II as the emulsifying agent, and Triton N-101 as the inverting detergent were prepared. The stability of these emulsions, which contained varying amounts of water, was determined in accordance with the procedure of Example IV. The results of these determinations are set forth in the following Table II:

TABLE II

|  | Emulsion 1 | Emulsion 2 | Emulsion 3 | Emulsion 4 | Emulsion 5 |
|---|---|---|---|---|---|
| % H$_2$O | 41.9% | 38.2% | 35.9% | 34.7% | 29.7% |
| Bulk Viscosity (cps) | 225 | 125 | 75 | 75 | 350 |
| Oil Separation | ¼ ml | ¼ ml | <¼ ml | ¼ ml | ½ ml |
| Creaming | ½ ml | ½ ml | 1¼ ml | ¼ ml | 1¼ ml |
| Days in oven @ 50° C. | 33 | 37 | 33 | 35 | 37 |
| Appearance | White | White transparent | Transparent | Transparent to Slightly White | White |

EXAMPLE VI

A series of polymeric emulsion containing a copolymer of acrylamide and 10 mole % of methylchloride quaternary of dimethylaminoethylmethacrylate a the polymer component, the emulsifier blend used in Example III as the emulsifying agent, and Trition N-101 as the inverting detergent were prepared in accordance with the procedure of Example III. The stability of these emulsions, which contained varying amounts of water, was determined in accordance with the procedure of Example IV. The results of these determinations are set forth in the following Table III:

TABLE III

|  | Emulsion 1 | Emulsion 2 | Emulsion 3 | Emulsion 4 |
|---|---|---|---|---|
| % H$_2$O | 43.6% | 39.7% | 33.8% | 29.8% |
| Bulk Viscosity (cps) | Thick Cream | 100 | 100 | <100 |
| Oil Separation | — | ¼ ml | ¼ ml | ¼ ml |
| Creaming | — | ¾ ml | ½ ml | ¼ ml |
| Days in oven @ 50° C. | — | 29 | 29 | 29 |
| Appearance | White | White | Transparent | White |

What is claimed is:

1. In an improved water-in-oil emulsion of the type which contains one or more finely divided water soluble vinyl addition polymers, one or more water soluble water-in-oil emulsifying agents, a hydrocarbon liquid and an aqueous phase, the improvement comprising an aqueous phase ranging from about 30% to about 50% by weight of the emulsion.

2. An improved water-in-oil emulsion according to claim 1 which further comprises one or more inverting surfactants.

3. An improved water-in-oil emulsion according to claim 2 wherein said surfactants are hydrophilic.

4. An improved water-in-oil emulsion according to claim 3 wherein said surfactants are selected from the group consisting of ethoxylated nonyl phenols, ethoxylated nonyl phenol formaldehyde resin, dioctyl esters of sodium sulfosuccinate, octyl phenol polyethozy ethanol and mixtures of one or more of the foregoing surfactants and polyethylene glycol.

5. An improved water-in-oil emulsion according to claim 2 which comprises from about 0.2 to about 5% weight of said one or more surfactants based on the total weight of the emulsion.

6. An improved water-in-oil emulsion according to claim 5 wherein said % weight of said surfactants is from about 0.5 to about 3.

7. An improved water-in-oil emulsion according to claim 6 wherein said % by weight of said surfactant is from about 0.75 to about 2.

8. An improved water-in-oil emulsion according to claim 1 wherein the % by weight of said aqueous phase is from about 25 to about 60% by weight of said emulsion.

9. An improved water-in-oil emulsion according to claim 8 wherein said % by weight is from about 30 to about 50.

10. Am improved water-in-oil emulsion according to claim 9 wherein said % by weight is from about 32 to about 41.

11. An improved water-in-oil emulsion according to claim 1 wherein said surfactants are selected from the group consisting of cationic, anionic and non-ionic surfactants.

12. An improved water-in-oil emulsion according to claim 1 wherein said polymer is selected from the group consisting of anionic and non-ionic polymers and said surfactants are selected from the group consisting of anionic and non-ionic surfactants.

13. An improved water-in-oil emulsion according to claim 12 wherein said polymer is a non-ionic polymer.

14. An improved water-in-oil emulsion according to claim 13 wherein said polymer is polyacrylamide.

15. An improved water-in-oil emulsion according to claim 14 wherein said % weight of said aqueous phase is from about 30 to about 35.

16. An improved water-in-oil emulsion according to claim 15 wherein said emulsifying agents have an HLB ratio of about 4.5 to about 5.5.

17. An improved water-in-oil emulsions according to claim 16 wherein said HLB ratio is about 5.

18. An improved water-in-oil emulsions according to claim 1 wherein said surfactant consist of a mixture of one or more water soluble polyethylene glycols and one or more anionic, cationic or non-ionic surfactants.

19. An improved water-in-oil emulsion according to claim 1 wherein said polymer is an anionic polymer.

20. An improved water-in-oil emulsion according to claim 19 wherein said polymer is a copolymer of acrylamide and acrylic acid.

21. An improved water-in-oil emulsion according to claim 20 wherein the weight percent of said aqueous phase is from about 34 to about 42.

22. An improved water-in-oil emulsion according to claim 20 wherein said emulsifying agent has an HLB ratio of from about 0.5 to about 75.

23. An improved water-in-oil emulsion according to claim 1 wherein said polymer is a cationic polymer.

24. An improved water-in-oil emulsion according to claim 23 wherein said polymer is a copolymer of acrylamide and the methylchloride quaternary of dimethylaminomethylmethacrylate.

25. An improved water-in-oil emulsion according to claim 23 wherein the weight percent of said aqueous phase is from about 29 to about 40.

26. A method of rapidly dissolving water-soluble vinyl addition polymers in water which comprises inverting the surfactant according to claim 2 by adding it to water.

27. An improved water-in-oil emulsion according to claim 1 wherein said weight percent of said aqueous phase is from about 30% to about 37% by weight.

28. An improved water-in-oil emulsion according to claim 24 wherein said weight percent of said aqueous phase is from about 34% to about 35% by weight.

29. An improved water-in-oil emulsion according to claim 21 wherein the weight percent of said aqueous phase is from about 34% to about 38.5% by weight.

30. An imrpoved water-in-oil emulsion according to claim 1 wherien said vinyl addition polymers are selected from the group consisting of polyacrylamide, and co-polymers of acrylamide of acrylic acid, and wherein said weight percent of said aqeuous phase is from about 30% to about 38.2% by weight.

* * * * *